T. J. SAYRE.
Lawn-Mower.

No. 212,626.  Patented Feb. 25, 1879.

WITNESSES
Sam'l R. Turner
J. B. Holderby

INVENTOR
Thomas J. Sayre
By his Attorneys R. S. & A. P. Lacey

UNITED STATES PATENT OFFICE.

THOMAS J. SAYRE, OF CAPE MAY CITY, NEW JERSEY.

IMPROVEMENT IN LAWN-MOWERS.

Specification forming part of Letters Patent No. 212,626, dated February 25, 1879; application filed October 28, 1878.

*To all whom it may concern:*

Be it known that I, THOMAS J. SAYRE, of Cape May City, in the county of Cape May and State of New Jersey, have invented certain new and useful Improvements in Lawn-Mowers; and I do hereby declare that the following is a full, clear, and exact description of the invention, which will enable others skilled in the art to which it appertains to make and use the same, reference being had to the accompanying drawings, and to letters of reference marked thereon, which form a part of this specification.

This invention has for its object to furnish a lawn-mower which will cut the grass and hold the latter, so that it may be removed from the lawn, thus dispensing with the necessity of again passing over the ground with a rake.

It consists in a wide platform having its rear end mounted on a roller and its forward end provided with a toothed plate or knife, and having secured to its sides curved bars, in the outer ends of which is supported a solid flanged spiral cutter-wheel, on which are placed the knives, the whole arranged as hereinafter explained.

Figure 1:
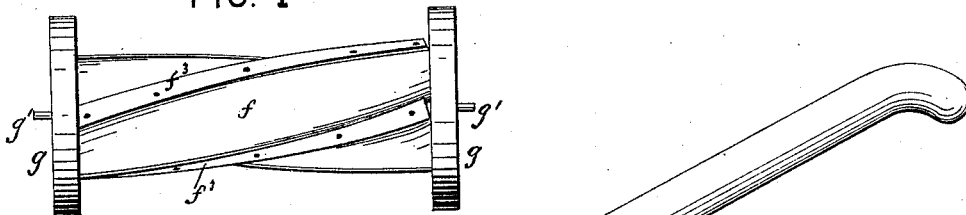
Figure 2:
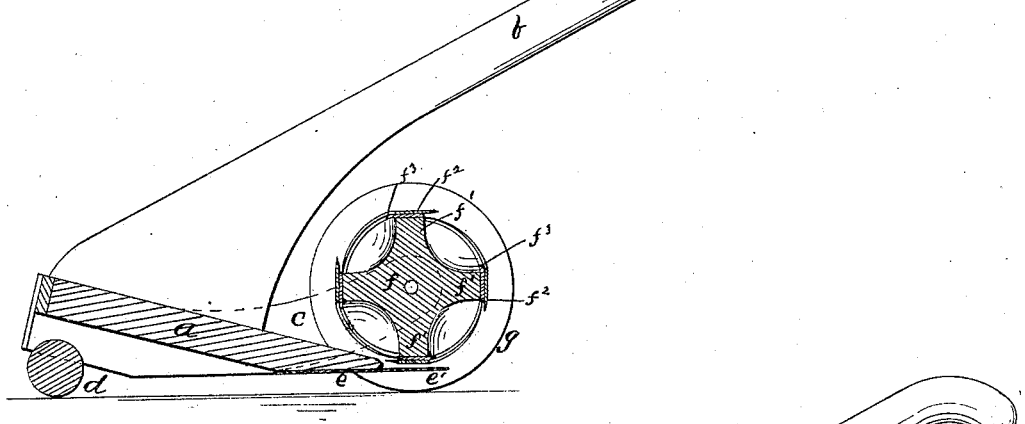
Figure 3:
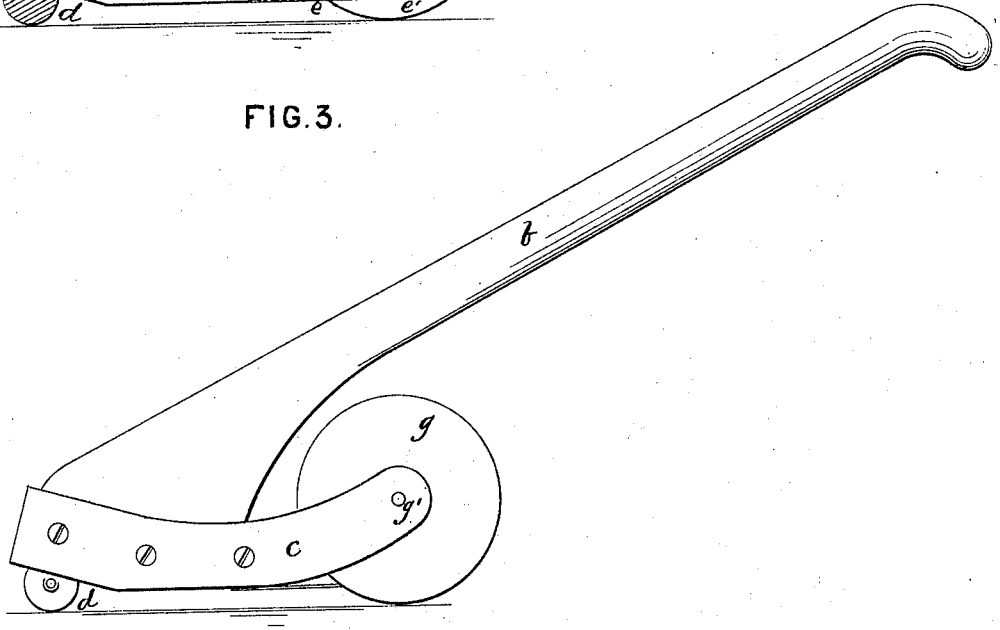

In the drawings, Figure 1 is the flanged spiral cutter-wheel. Fig. 2 is a longitudinal vertical section, and Fig. 3 a side elevation, of a lawn-mower constructed according to my invention.

$a$ is the platform on which the grass, after being cut, is thrown. Centrally fixed to said platform is the handle $b$, which extends forward over the cutters, so that the device is operated by a drawing movement, and not by pushing, as in the ordinary lawn-mowers. On the sides of the platform are affixed the bars $c\ c$, the forward ends of which are curved upward, as shown, and are provided with bearings for supporting the pins of the cutter-wheel.

The rear end of the platform is supported at a proper distance from the ground by the roller $d$, which is suitably journaled to the under side thereof, as shown.

The forward end of the platform inclines downward and has its under side suitably beveled backward, so that it will slide easily over the surface of the ground.

Suitably fixed to the forward end of the platform is the cutter plate or bar $e$, the edge of which is cut or formed with the long sharp tapering beveled teeth $e'$.

$f$ is the solid cutter-wheel formed in a series of spiral flanges, $f^1$, on the outer edges of which are fixed the toothed plates $f^2$ or the plain bands $f^3$, or both, as may be desired.

The cutter-wheel $f$ has affixed to its ends the driving-wheels $g\ g$, which are provided with bearing-pins $g'$, journaled in the side plates $c\ c$ vertically over the teeth $e'$ of plate $e$.

The platform $a$ has its edges sufficiently cut away to permit the wheels to rest on the ground and turn freely.

The plates $f^2\ f^3$ have one edge made sharp, and the wheel $f$ is so arranged that the knives will cut against the plate $e'$, as in ordinary devices.

In the operation of the machine all the cut grass is carried back by the flanges $f^1$ and deposited on the platform $a$. When the teeth $e'$ get clogged by rubbish of any kind a slight rear movement of the machine will cause a reverse movement of the wheel $f$, and the back edge of the plate $f^2$ or $f^3$ will clear the said teeth.

This device may be used as a rake and winnowing-machine. If the grass has been cut by the ordinary lawn-mower or other device, and left scattered over the ground, it may be gathered by this device of mine and carried suitable distances, and by elevating the front end of the platform will be deposited in the windrow.

Having thus described my invention, what I claim, and desire to secure by Letters Patent, is—

The combination, with the wheel $f$, having the flanges $f^1$ and cutter-plates $f^2$ or $f^3$, and supported on driving-wheels $g\ g$, journaled in the side plates $c\ c$ and cutter-bar $e$, of the platform $a$, roller $d$, and handle $b$, substantially as and for the purpose set forth.

In testimony that I claim the foregoing as my own I affix my signature in presence of two witnesses.

THOMAS J. SAYRE.

Witnesses:
 JOHN E. WEBB,
 EDWIN SAYRE.